United States Patent
Kumar et al.

(10) Patent No.: US 9,779,293 B2
(45) Date of Patent: Oct. 3, 2017

(54) METHOD AND TOOL FOR POST-MORTEM ANALYSIS OF TRIPPED FIELD DEVICES IN PROCESS INDUSTRY USING OPTICAL CHARACTER RECOGNITION AND INTELLIGENT CHARACTER RECOGNITION

(71) Applicant: Honeywell International Inc., Morris Plains, NJ (US)

(72) Inventors: Jammikunta Ravi Kumar, Hyderabad (IN); Amit Kumar, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 55 days.

(21) Appl. No.: 15/008,282

(22) Filed: Jan. 27, 2016

(65) Prior Publication Data
US 2017/0213082 A1    Jul. 27, 2017

(51) Int. Cl.
*G06K 9/34* (2006.01)
*G06K 9/00* (2006.01)
*G06T 11/60* (2006.01)

(52) U.S. Cl.
CPC .......... *G06K 9/00442* (2013.01); *G06T 11/60* (2013.01); *G06K 2209/01* (2013.01)

(58) Field of Classification Search
CPC . G06K 9/00442; G06K 2209/01; G06T 11/60
See application file for complete search history.

(56) References Cited

U.S. PATENT DOCUMENTS

| | | | |
|---|---|---|---|
| 8,953,886 B2 | 2/2015 | King et al. | |
| 8,959,399 B2 | 2/2015 | Guenther et al. | |
| 9,218,233 B2 | 12/2015 | Venditti et al. | |
| 9,239,574 B2 | 1/2016 | Tandon et al. | |
| 9,396,404 B2 | 7/2016 | Goncalves | |
| 9,477,457 B1* | 10/2016 | Langton | G06F 8/61 |
| 2007/0078628 A1 | 4/2007 | Virji et al. | |

(Continued)

FOREIGN PATENT DOCUMENTS

| | | | | |
|---|---|---|---|---|
| JP | 2002-342711 | * | 11/2002 | G06K 9/20 |
| JP | 2002342711 A | | 11/2002 | |

OTHER PUBLICATIONS

Notification of Transmittal of the International Search Report and the Written Opinion of the International Searching Authority, or the Declaration dated Apr. 14, 2017 in connection with International Patent Application No. PCT/US2017/013130.

*Primary Examiner* — Amara Abdi

(57) ABSTRACT

A method includes capturing at least one screenshot of a display screen including an initial screenshot. The method includes removing text from the initial screenshot to generate a base image. The method includes identifying a background of the initial screenshot as a closed region. The method includes, for each of the at least one screenshots: storing a time of capturing the screenshot; identifying text, text color, and text location in the screenshot; identifying each closed region in the screenshot that is different from the background of the initial screenshot, and a region color and region location for each identified closed region in the screenshot; storing the region color and the region location for each identified closed region; and storing the text color and the text location of the identified text.

20 Claims, 14 Drawing Sheets

(56) References Cited

U.S. PATENT DOCUMENTS

| | | | |
|---|---|---|---|
| 2007/0150368 A1* | 6/2007 | Arora | G06Q 30/02 |
| | | | 705/26.1 |
| 2010/0245870 A1* | 9/2010 | Shibata | G06K 9/033 |
| | | | 358/1.9 |
| 2012/0033249 A1* | 2/2012 | Van | G06F 17/30843 |
| | | | 358/1.15 |
| 2013/0236100 A1* | 9/2013 | Deaver | G06F 21/552 |
| | | | 382/176 |
| 2015/0117747 A1 | 4/2015 | Smith et al. | |

* cited by examiner

METHOD AND TOOL FOR POST-MORTEM ANALYSIS OF TRIPPED FIELD DEVICES IN PROCESS INDUSTRY USING OPTICAL CHARACTER RECOGNITION AND INTELLIGENT CHARACTER RECOGNITION

TECHNICAL FIELD

This disclosure is generally directed to control systems. More specifically, this disclosure is directed to a method and tool for post-mortem analysis of tripped field devices in the process industry using Optical Character recognition (OCR) and Intelligent Character Recognition (ICR).

BACKGROUND

A process unit generates multiple critical alarms and sometimes can come to a halt because a process plant, such as power generation plant, has a frequent tripping problem. When tripping occurs, the operator may want to review the previous values of critical process parameters of any processing unit to diagnose the issue. For example, the operator may want to review the last twenty (20) minutes of activity of any processing unit during which the tripping occurred, but the operator has no way to go back and recheck the console station monitored process unit of a plant to perform post-mortem analysis of the tripping issue.

An operator, who is monitoring a process unit of a critical process on a console station, can visually recognize currently tripped devices. Once recognized, the operator may not have any comprehensive or handy tool to view the past information of the process unit (which the operator was monitoring via the console station) that includes one of the devices that has gotten tripped. No handy tool exists to enable an operator to configure the critical devices of a process unit, whose postmortem analysis will be required once the process unit comes to a halt.

SUMMARY

This disclosure provides an apparatus and method for performing post-mortem analysis of tripped field devices in the process industry using Optical Character recognition (OCR) and Intelligent Character Recognition (ICR) techniques.

In a first example, a method includes capturing at least one screenshot of a display screen including an initial screenshot. The method includes removing text from the initial screenshot to generate a base image. The method includes identifying a background of the initial screenshot as a closed region. The method includes, for each of the at least one screenshots: (i) storing a time of capturing the screenshot; (ii) identifying text, text color, and text location in the screenshot; (iii) identifying each closed region in the screenshot that is different from the background of the initial screenshot, and a region color and region location for each identified closed region in the screenshot; (iv) storing the region color and the region location for each identified closed region; and (v) storing the text color and the text location of the identified text.

In a second example, an apparatus includes a memory and at least one processor coupled to the memory. The at least one processor is configured to capture at least one screenshot of a display screen including an initial screenshot. The at least one processor is configured to remove text from the initial screenshot to generate a base image. The at least one processor is configured to identify a background of the initial screenshot as a closed region. The at least one processor is configured to: for each of the at least one screenshot: (i) store a time of capturing the screenshot in the memory; (ii) identify text, text color, and text location in the screenshot; (iii) identify each closed region in the screenshot that is different from the background of the initial screenshot, and a region color and region location for each identified closed region in the screenshot; (iv) store, in the memory, the region color and the region location for each identified closed region; and (v) store, in the memory, the text color and the text location of the identified text.

In a third example, a non-transitory computer readable medium embodying a computer program is provided. The computer program includes computer readable program code that, when executed by processing circuitry, causes the processing circuitry to capture at least one screenshot of a display screen including an initial screenshot. The computer program includes computer readable program code that, when executed by processing circuitry, causes the processing circuitry to remove text from the initial screenshot to generate a base image. The computer program includes computer readable program code that, when executed by processing circuitry, causes the processing circuitry to identify a background of the initial screenshot as a closed region. The computer program includes computer readable program code that, when executed by processing circuitry, causes the processing circuitry to, for each of the at least one screenshots: (i) store a time of capturing the screenshot in memory; (ii) identify text, text color, and text location in the screenshot; (iii) identify each closed region in the screenshot that is different from the background of the initial screenshot, and a region color and region location for each identified closed region in the screenshot; (iv) store the region color and the region location for each identified closed region; and (v) store the text color and the text location of the identified text.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 10, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
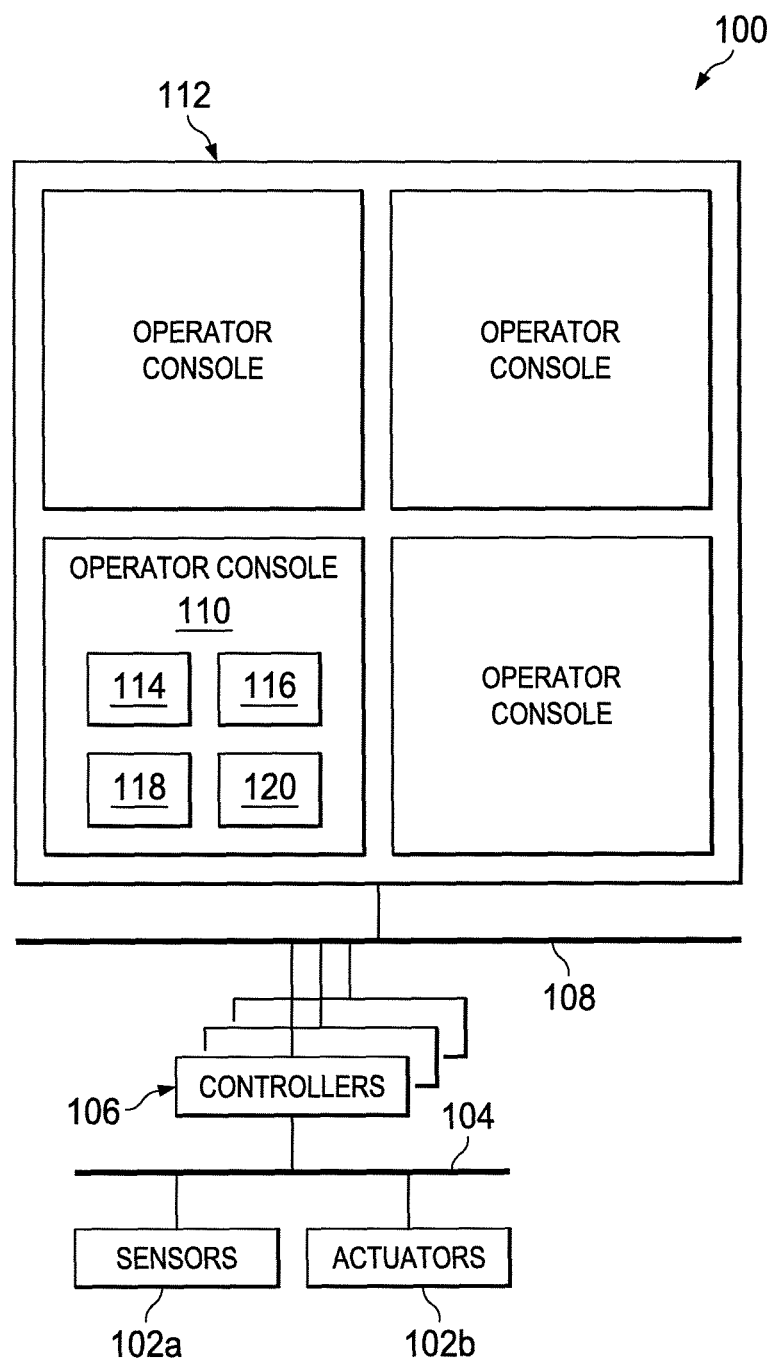
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof). Example processing facilities include manufacturing plants for producing at least one product or other material, chemical plants, crude oil refineries, ore processing plants, and paper or pulp manufacturing and processing plants. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system. Example actuators 102b include heaters, motors, catalytic crackers, or valves.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

Various controllers 106 are coupled directly or indirectly to the network 104. The controllers 106 can be used in the system 100 to perform various functions. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent multivariable controllers, such as Robust Multivariable Predictive Control Technology (RMPCT) controllers or other type of controllers implementing model predictive control (MPC) or other advanced predictive control (APC).

Operator access to and interaction with the controllers 106 and other components of the system 100 can occur via various operator consoles 110. As described above, each operator console 110 could be used to provide information to an operator and receive information from an operator. For example, each operator console 110 could provide information identifying a current state of an industrial process to the operator, including warnings, alarms, or other states associated with the industrial process. Each operator console 110 could also receive information affecting how the industrial process is controlled, such as by receiving setpoints for process variables controlled by the controllers 106 or by receiving other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

Operators are typically responsible for managing industrial processes and often need to act quickly and efficiently to maintain safe and profitable operations. To do this, operators continuously monitor the current state of an industrial process, evaluating whether the current state requires human intervention, and (if so) performing the interventions and assessing the outcomes of the interventions. An operator console 110 supporting these functions typically includes one or more display screens and one or more keyboards and pointing devices, such as mice or trackballs.

When the current state of an industrial process includes a currently tripped field device, one or more of the display screens in the operator console 110 provides a visual indicator of the currently tripped device(s). An operator, who is monitoring a critical process of the industrial process, may recognize that the indicator of the currently tripped device(s) is part of the critical process, and may desire a comprehensive or handy tool to view the past information of the process unit of that includes the currently tripped device(s). If a field device is tripping frequently because of an electro-mechanical reason, plant maintenance personnel could benefit from scheduling a maintenance activity associated with the frequently tripping field device and also maintaining an inventory of the devices.

To facilitate control over the process system, the operator console 110 may include a field asset maintenance system (FAMS) application 120. The FAMS application 120 includes any suitable application for generating graphical displays representing at least part of a process being monitored and/or controlled. The FAMS application 120 can include features of a human-machine interface (HMI) applications. An HMI application generally represents an application that generates graphical displays for presenting content to operators. The graphical displays visually represent one or more processes (or portions thereof) being monitored and/or controlled by the operators. An HMI application can present any suitable graphical data to an operator, such as a process schematic that graphically illustrates a process to be controlled. More particularly, the FAMS application 120 provides a comprehensive or handy tool that not only provides a view of the past information of the process unit that includes the currently tripped device(s), but also configures the critical devices of a process unit for which a post-mortem analysis will be required once the process unit comes to a halt, such as a halt resulting from tripping of one or more of the critical devices. The FAMS application 120 enables the operator to play back the maintenance view screen in the form of video and to find the causes of tripping of field device(s) by using Optical Character recognition (OCR) and Intelligent Character Recognition (ICR) techniques. ICR is an advanced OCR technique, such that the ICR recognizes custom fonts and symbols.

In accordance with this disclosure, the FAMS application 120, when executed by one or more computer processors, causes the one or more computer processors to perform post-mortem analysis of tripped field devices in the process industry using OCR and ICR techniques. The FAMS application 120 provides the operator with a tool to select the available views of various process units running on various operator consoles 110. The FAMS application 120 enables the operator to select the critical devices of a process unit and the monitoring frequency to capture snapshots of the view in the selected process unit. The FAMS application 120 archives the periodic snapshots of the views of the process unit on an operator console 110 and saves the periodic snapshots in an encrypted and compressed format to conserve disk space. The FAMS application 120 implements an image processing algorithm such that archiving does not consume too much disk space. Once the tripping occurs, the FAMS application 120 can provide the snapshots of the process unit as though the snapshots depict a continuous running process. By using the snapshots provided by the FAMS application 120, the operator can monitor the transition of various critical parameters of all critical devices due to which the tripping occurred and can take preventive action.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which post-mortem analysis of tripped field devices in the process industry is performed using OCR and ICR techniques. FIG. 1 does not limit this disclosure to any particular configuration or operational environment.

Figure 2A:
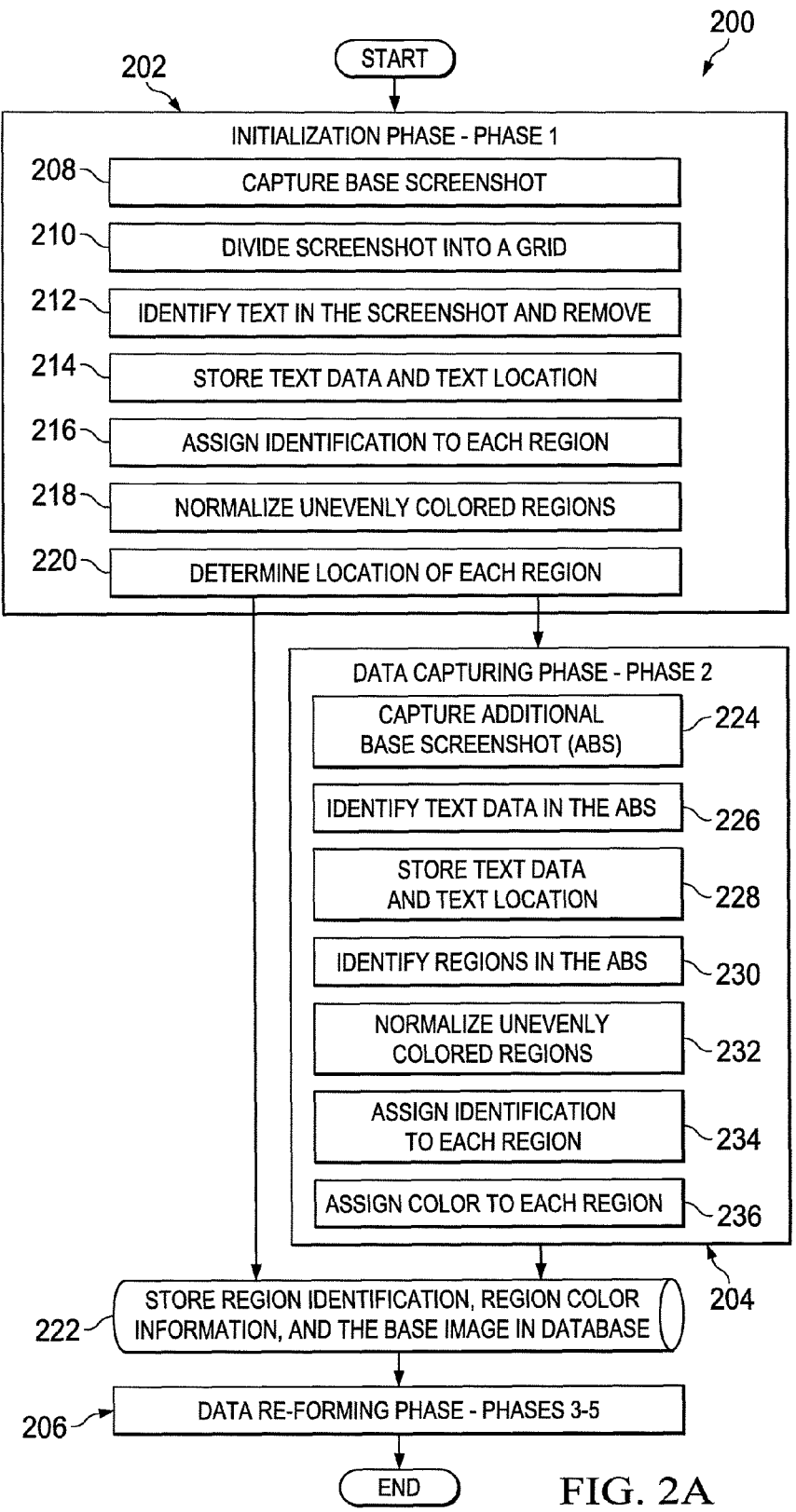
FIGS. 2A and 2B illustrate an example process for performing post-mortem analysis of tripped field devices in the process industry using Optical Character Recognition (OCR) and Intelligent Character Recognition (ICR) techniques according to this disclosure.
Figure 2B:
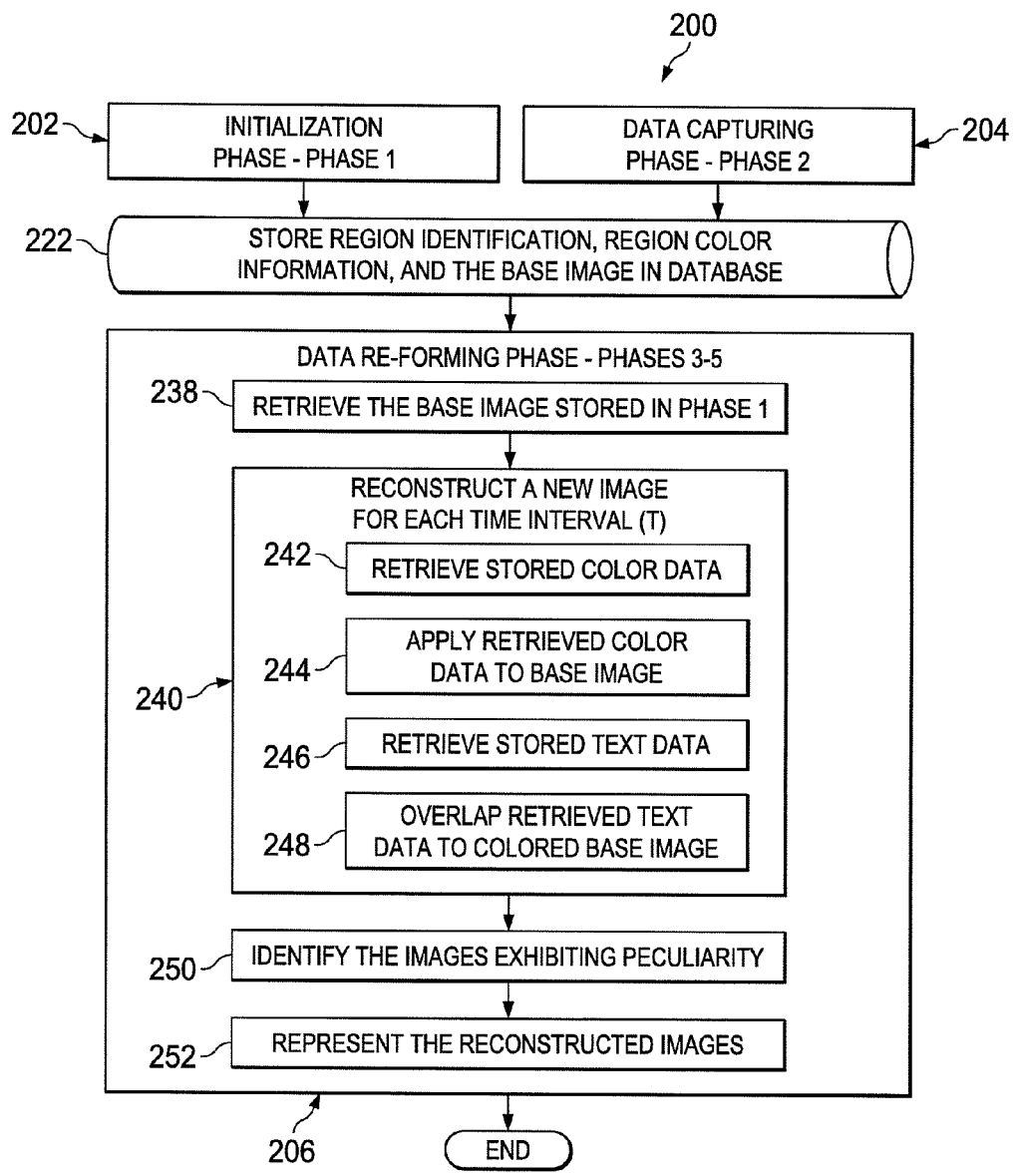

FIGS. 2A and 2B illustrate an example method 200 for performing post-mortem analysis of tripped field devices in the process industry using OCR and ICR techniques according to this disclosure. For ease of explanation, FIGS. 2A and 2B will be described as though a processing device 114 performs the method 200 by executing the FAMS application 120. The embodiment of the method 200 shown in FIGS. 2A and 2B is for illustration only. Other embodiments could be used without departing from the scope of this disclosure.

The method 200 includes five (5) phases. Phase one 202 is an initialization phase for preparing a base image. Phase two 204 is a data capturing phase for capturing screenshots for each interval. A data re-forming phase 206 includes Phase three 240, Phase four 250, and Phase five 252. Phase three 240 includes a method of forming images from stored data. Phase four 250 includes identifying the images and data which have a peculiar behavior. Phase five 252 includes implementing a method of representing the stored data in the tools to perform a root cause analysis (RCA). These five phases can be associated with a centralized database for storing data, so screen data will be accessible to the operator through the FAMS application 120.

Phase one 202 includes operations 208-220. In operation 208, the processing device 114 captures a base screenshot 300 (shown in FIG. 3). This initial image of the view of the display screen of the operator console is captured by the FAMS application 120 and is the base for subsequent images.

Figure 4:
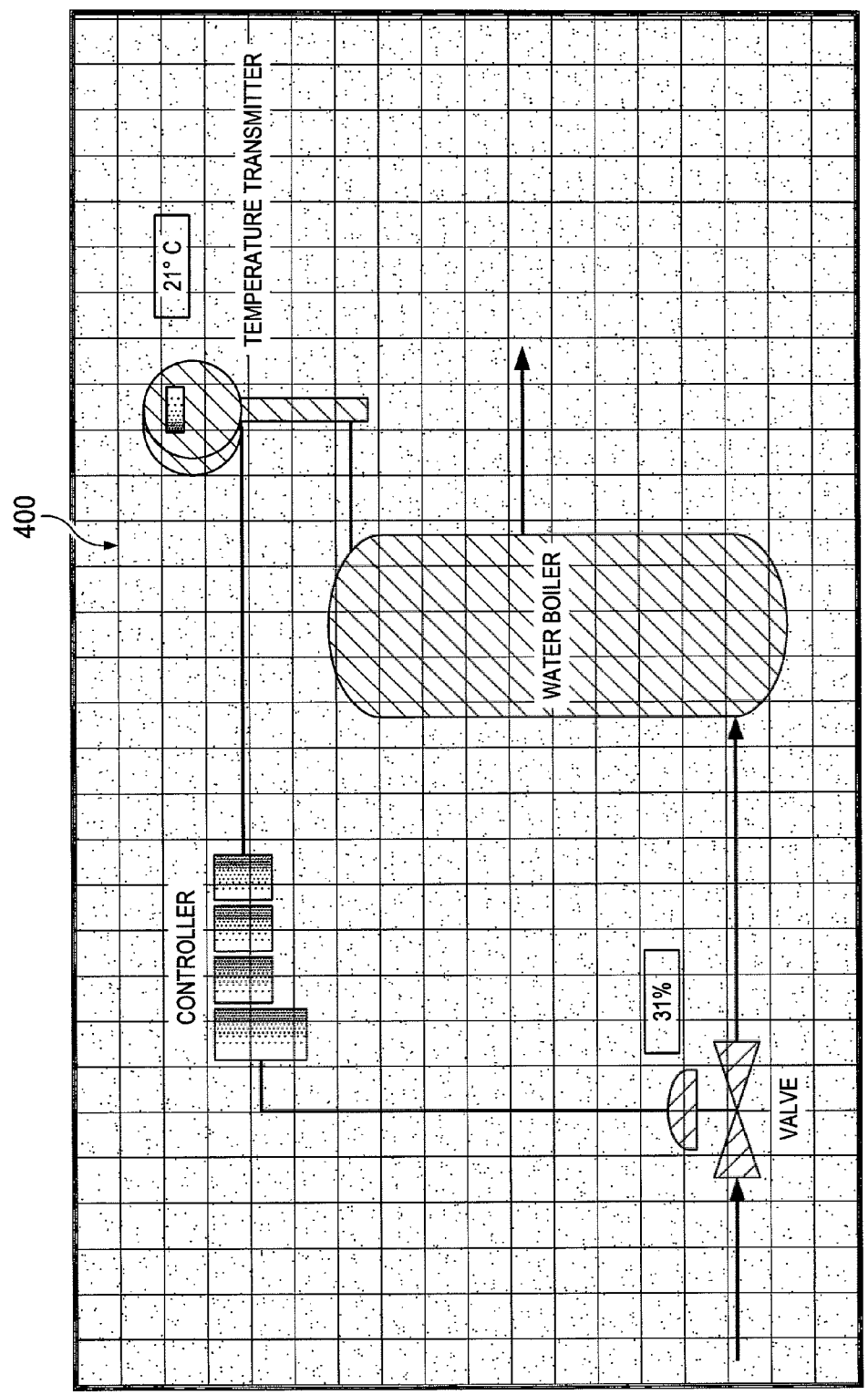
FIG. 4 illustrates the base screenshot of FIG. 3 divided into a grid according to this disclosure.

In operation 210, the processing device 114 divides the initial base screenshot 300 into a grid 400 (shown in FIG. 4). For example, the base screenshot 300 is divided into a set of blocks based on the image size. This is needed to avoid scaling problems. Scaling problems may occur if this algorithm is executed on multiple screens of different resolutions for a same process unit. For example, scaling problems may occur if the algorithm of Phase one 202 is executed on one screen and the algorithm of Phase two 224 is executed on another screen that has a different resolution that the screen upon which the algorithm of Phase one 202 was executed. A grid pattern (for example, the grid 400) is helpful to apply uniform measurements across the multiple screens. In certain embodiments the screen size is predefined, and accordingly, the set of blocks within the grid can have a predefined quantity or dimension. Alternatively, instead of a grid pattern, the pixel x-y coordinates can be used based on the screen resolution and the type of elements. This disclosure is not limited to the grid pattern alone or the pixel x-y coordinates alone, yet any suitable parameterization for identifying a location within an image can be used.

Figure 5:
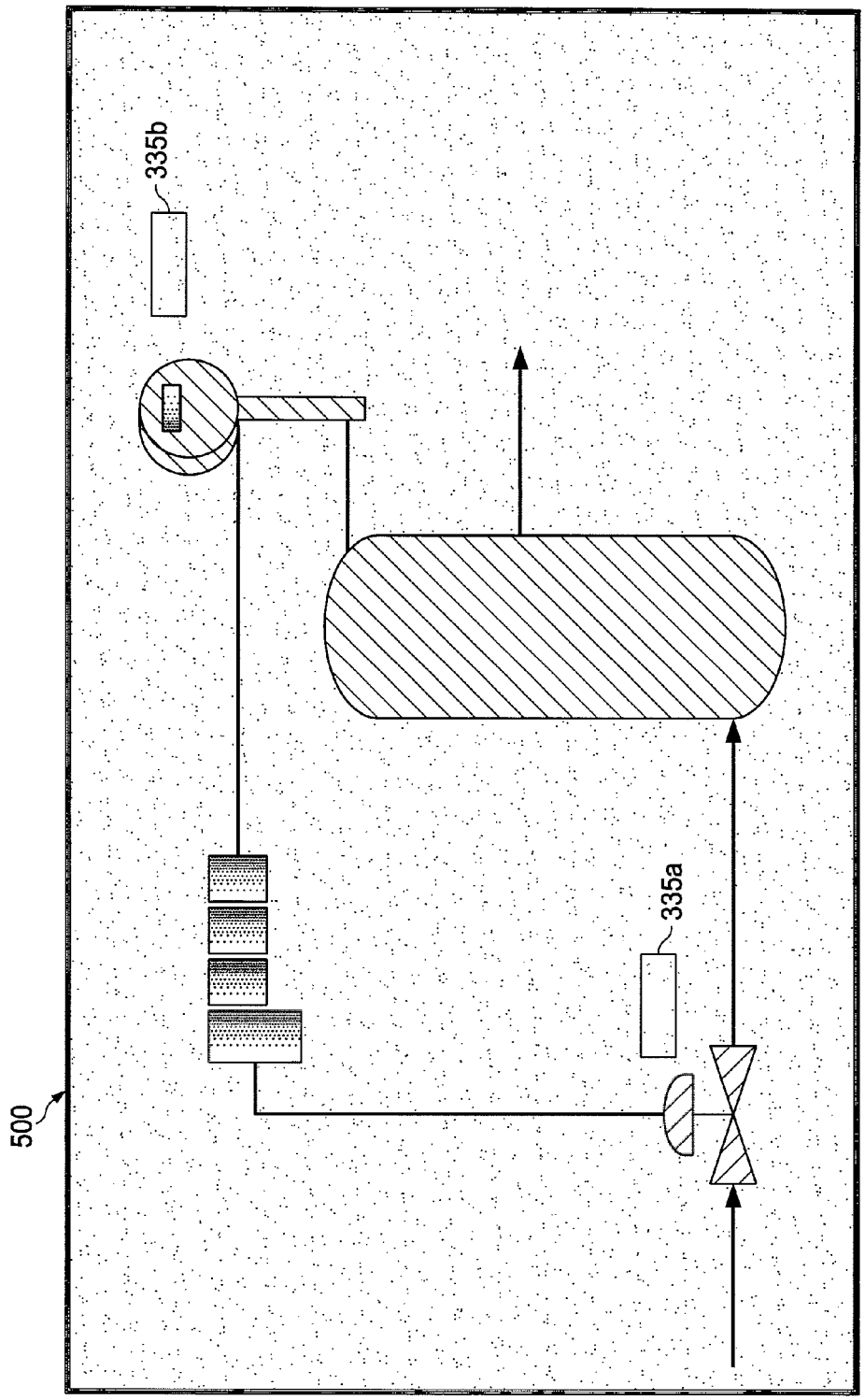
FIG. 5 illustrates a textless base screenshot according to this disclosure.

In operation 212, the processing device 114 identifies the text in the initial base screenshot 300. Also in operation 212, the processing device 114 removes the text from the base screenshot 300 in order to generate a base image. As described more particularly below, FIG. 5 shows a textless base screenshot 500, namely the base screenshot with text removed. For example, the processing device 114 finds the text data in the image by applying the OCR and ICR techniques and converts that text color to a background color. For example, in the base screenshot 300, the text data "Water Boiler" has a text color of black overlaying a different background color (e.g., red), and the generation of the base image includes making the text data "Water Boiler" have a text color of red. In certain embodiments, an OCR technique and/or the ICR technique can be applied to the base screenshot to find text data.

In operation 214, the processing device 114 stores the text data and text location information corresponding to the initial base screenshot 300. Note that a time of capturing a screenshot can be used as an identifier of the screenshot, and as such, the time of capturing the screenshot can be linked to the text data and text location of the screenshot as a way of denoting a correspondence to the screenshot. For example, the processing device 114 determines the location of each text data in the base screenshot, and stores the location in a database and in correspondence to the text data. For example, the text data in the base screenshot 300 can include a string of characters forming the term "Temperature transmitter," which spans columns 23-29 within the fifth row of the grid. When the boxes are identified by {row, column} format, the text data "Temperature transmitter" corresponds to boxes [5,23], [5,24], [5,25], [5,26], [5,27], and [5,28]. Table 1 provides an example of storing text location information in correspondence to text data in the database.

TABLE 1

Database storage of Text Data and corresponding Text Location Information

| Text data | Block Numbers |
| --- | --- |
| Controller | [3, 9][3, 10], [3, 11] |
| 21° C. | [3, 25][3, 26][3, 27] |
| Temperature transmitter | [5, 23][5, 24][5, 25][5, 26] [5, 27][5, 28] |
| Water Boiler | [12, 16][12, 17][12, 18] |
| 31% | [14, 8][14, 9] |
| Valve | [17, 6][17, 7][17, 8] |

Figure 6:
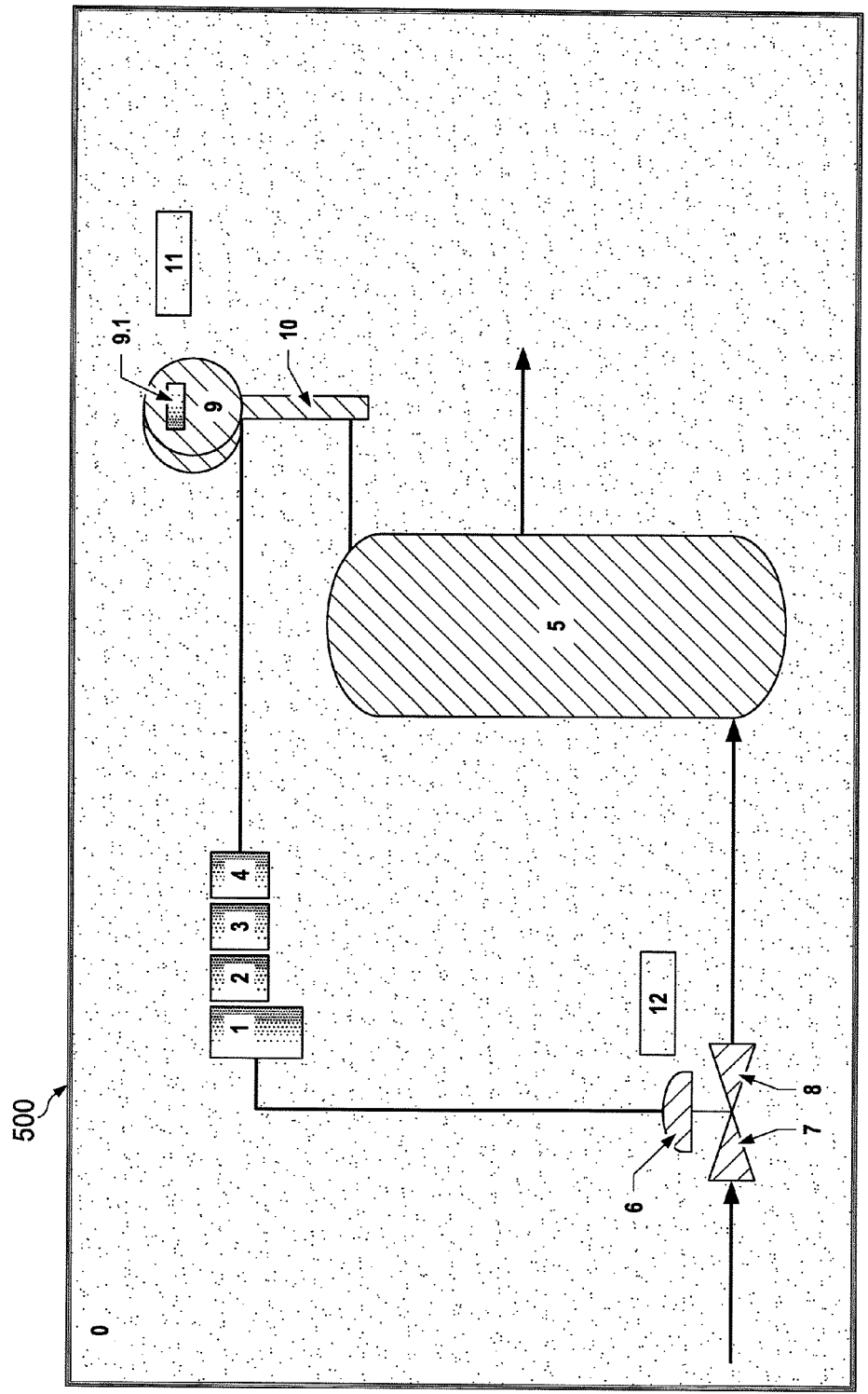
FIG. 6 illustrates a region and sub-regions of the textless base screenshot of FIG. 5 according to this disclosure.

In operation 216, the processing device 114 assigns identification to each region of the base screenshot. One or more regions may contain smaller regions inside its closed boundary. That is, the processing device 114 finds each region and each sub-region in the base screenshot. To find a region or sub-region, the processing device 114 finds a closed region that is not the same as the background image (shown by region ID number 0 in FIG. 6). To find a sub-region, the processing device 114 finds a closed region (shown by region ID number 9.1 in FIG. 6) within another closed region (shown by region ID number 9 in FIG. 6). As described more particularly below, FIG. 6 shows regions and sub-regions of the textless base screenshot 500 of FIG. 5. The processing device 114 assigns a region identification number to each region and sub-region. The processing device 114 may use a tree structure to assign a sub-region identification number, such as identifying Region 9 as a parent that includes sub-region 9.1 as its child.

Figure 7A:
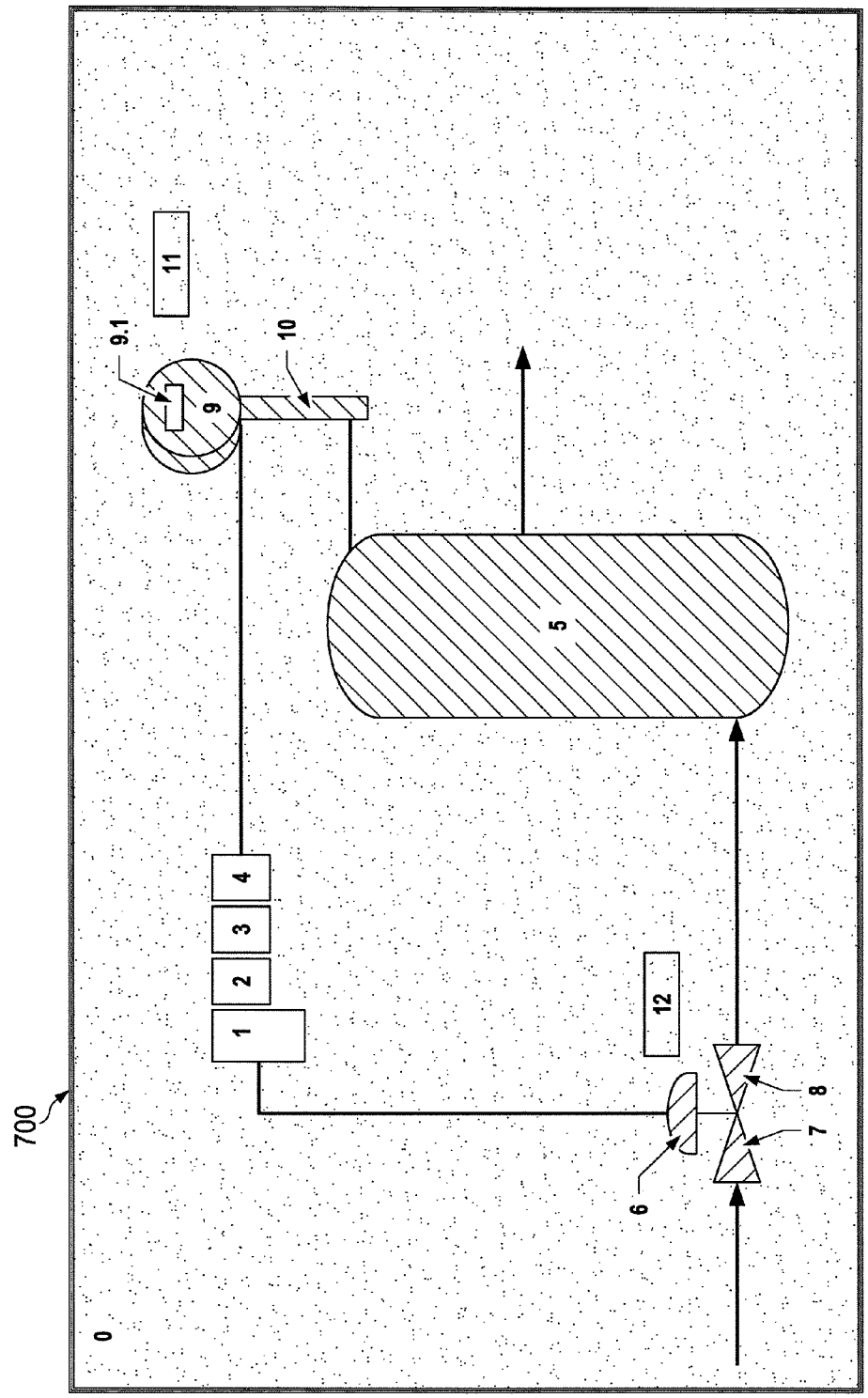
FIGS. 7A and 7B illustrate a region and sub-regions of the color-normalized textless base screenshot with a grid according to this disclosure.

In operation 218, the processing device 114 normalizes unevenly colored regions of the base screenshot. That is, the processing device 114 applies an equalization method to each region that includes more than one color to determine a uniform color for that region. For example, by processing the textless base screenshot 500, the processing device 114 determines that Regions 1-4 have a gradient color that fades from white to black, and that Region 9.1 has a gradient color that fades from black to white (in the left to right direction). Accordingly, the processing device 114 applies the equalization method to Regions 1-4 and sub-Region 9.1, which results in a determination that light grey is a uniform color for these previously multi-colored regions. As described more particularly below, FIG. 7A shows a color-normalized textless base screenshot.

Also in operation 218, the processing device 114 assigns a color to each region. In embodiments wherein the each region has been normalized to a uniform color, the processing device 114 assigns a single color, such as an RGB color format, to each region and sub-region. Table 2 provides an example of storing region identification numbers in correspondence to the region color in the database.

Figure 7B:
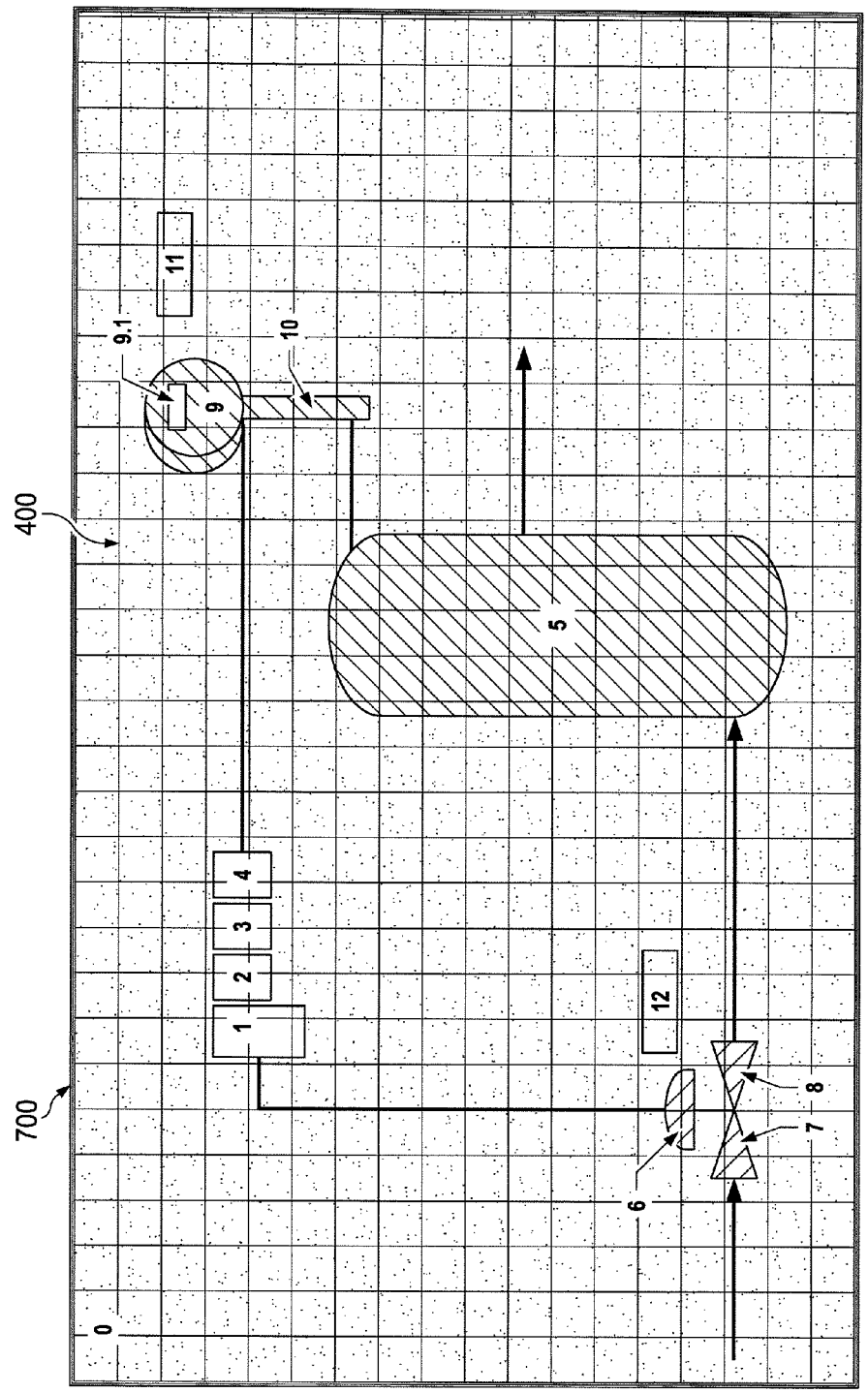

In operation 220, the processing device 114 determines the location of each region in the base screenshot, and stores the location in a database and in correspondence to the region identification number. As described more particularly below, FIG. 7B shows a color-normalized textless base screenshot divided according to the grid 400 of FIG. 4. For example, the Region 1 spans rows 4-6 of column 8 in the base screenshot. When the boxes are identified by {row, column} format, the Region 1 corresponds to boxes [4,8], [5,8], and [6,8]. Table 2 provides an example of storing region identification numbers in correspondence to the region location in the database. The block size of a grid pattern can be determined by screen resolution and the minimum distance among the elements and regions in the console station screenshot.

TABLE 2

Database storage of Region ID and corresponding Region Color Information and Region Location Information

| Region ID | Region Block | Region Color |
| --- | --- | --- |
| 0 | [2, 1][2, 2] | (123, 65, 32) |
| 1 | [4, 8][5, 8][6, 8] | (43, 123, 79) |
| 2 | [4, 9][5, 9] | (43, 123, 79) |
| 3 | [4, 10][5, 10] | (43, 123, 79) |
| 4 | [4, 11][5, 11] | (43, 123, 79) |
| 5 | [8, 18] . . . | (255, 0, 0) |
| 6 | . . . | . . . |
| 7 | . . . | . . . |
| 8 | . . . | . . . |
| 9 | . . . | . . . |
| 9.1 | . . . | . . . |
| 10 | . . . | . . . |
| 11 | . . . | . . . |

The method 200 proceeds from operation 220 to operation 222. In operation 222, the processing device 114 stores the region ID, region color information, the region location information and the base image in the database. The method 200 is not limited to storing information in the database as a batch of information, but also can store individual information in the database. In certain embodiments, the method 200 proceeds from operation 216 to operation 222 for storing the region ID in the database, and the method 200 returns to operation 222 after operation 218 in order to store the base image in the database. Once the base image, text data, and region data are stored in the database, the method 200 proceeds from operation 222 to Phase two 204. The base image, text data, and region data that are stored in the database during Phase one 202 will be used in subsequent phases (i.e., the data re-forming phase 206) for reconstructing images. In some embodiments, Phase one 202 may consider more parameters from the base image along with text, regions, color information for more accuracy and performance.

Phase two 204 includes operations 224-236. The method 200 includes repeating Phase two 204 periodically, namely at the frequency of the interval T. The interval T is a configurable value based on a user selection or a user requirement. Phase two 204 is similar to Phase one 202 in that the processing device 114 processes an initial base screenshot 300 to identify and store text data and region data such as Tables 1 and 2 in Phase 1, and in Phase two 204, the processing device 114 processes an additional base screenshot 300 to identify and store text data and region data such as in Tables 1 and 2. In certain embodiments, Phase two 204 can be different from Phase one 202 in that the processing device 114 processes an initial base screenshot 300 to generate and save the base image 700 in Phase one 202, yet the processing device 114 may not save additional base screenshots 300 in Phase two 204. Note that certain embodiments of Phase two 204 can include an operation of saving the additional base screenshots 300 in the database in addition to the corresponding text data and region data for each interval T, however, such an embodiment may consume more memory than other embodiments that store the corresponding text data and region data for each interval T without storing the additional base screenshots 300 itself. In some embodiments, Phase two 204 may consider more parameters from the base image along with text, regions, color information for more accuracy and performance.

In operation 224, the processing device 114 captures an additional base screenshot. This subsequent image of the view of the display screen of the operator console is captured by the FAMS application 120 after the elapse of the interval T, which commences upon completion of capturing a previous image or screenshot. In certain situations, the interval T may elapse without any change to the text data shown on the display screen in the operator console 110, and in such situations, the additional base screenshot may appear identical to the previous base screenshot. As a specific example, an additional base screenshot can appear identical to the initial base screenshot 300 of FIG. 3. In other situations, a change to the text data or color data shown on the display screen in the operator console 110 may occur during the interval T, and in such situations, the additional base screenshot may appear differently from the previous base screenshot.

In operation 226, the processing device 114 identifies the text in the additional base screenshot. For example, the processing device 114 finds the text data in the image by applying the OCR and ICR techniques.

In operation 228, the processing device 114 stores the text data and text location information corresponding to the additional base screenshot. For example, the processing device 114 can divide the additional base screenshot into a grid in a similar manner as operation 210, and determine the text location information.

In operation 230, the processing device 114 identifies one or more regions in the additional base screenshot. That is, the processing device 114 finds each region and each sub-region in the additional base screenshot.

In operation 232, the processing device 114 normalizes unevenly colored regions of the additional base screenshot, in a similar manner as in operation 218. In operation 234, the processing device 114 assigns a region identification number to each region and each sub-region identified or otherwise found in operation 230. In certain embodiments, operation 234 also includes the processing device 114 determining the location of each region in the additional base screenshot, and storing the location in a database and in correspondence to the region identification number. In operation 236, the processing device 114 assigns a color to each region and each sub-region of the additional base screenshot, in a similar manner as in operation 218.

The method 200 proceeds from operation 236 to operation 222. Once the text data and region data corresponding to the additional base screenshot are stored in the database, the method 200 proceeds from operation 222 to operation 224 to repeat Phase two 204. Note that there is a difference between Phase one 202 and Phase two 204 in operation 222, namely, in Phase two 204, there is no need to store the base image as the part of operation 222. But for more accuracy and performance, more images can be stored in Phase two 204 also. Once the processing device 114 receives input that indicates a user selection to replay some of the archived periodic screenshots, the method proceeds from operation 222 to the data re-forming phase 206.

The data re-forming phase 206 includes the operation 238, the operations within phase three 240, the operations within phase four 250, and the operations within phase five 252. In operation 238, the processing device 114 retrieves the base image from storage. That is, the processing device 114 accesses the base image that was generated in phase one 202 and stored in operation 222.

In Phase three 240, the method 200 includes iteratively reconstructing a new image for each time interval (T). More particularly, in Phase three 240, the method of forming images from stored data is implemented by the processing device 114, which: retrieves stored color data in operation 242; applies the retrieved color data to the base image in operation 244; retrieves stored text data in operation 246; and overlaps the retrieved text data to the colored base image in operation 248. Note that there will be additional respective operations in Phase three 240 for embodiments wherein, in the console station screenshot or base image, Phase one 202 and/or Phase two 204 consider additional parameters along with text, regions, color information for more accuracy and performance.

Figure 3:
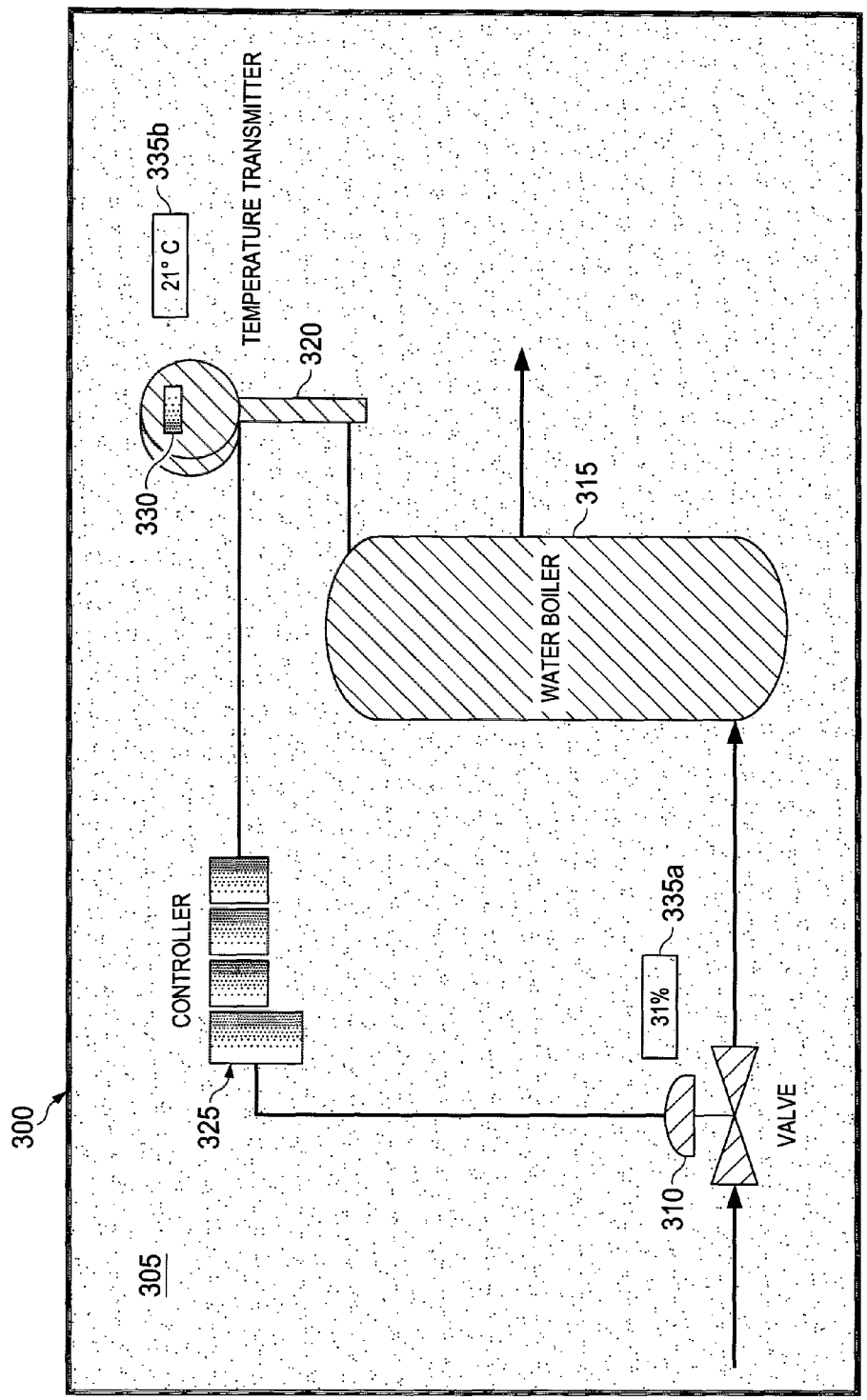
FIG. 3 illustrates an example base screenshot of an operator console display screen that provides a view of selected critical devices of a process unit according to this disclosure.
Figure 8A:
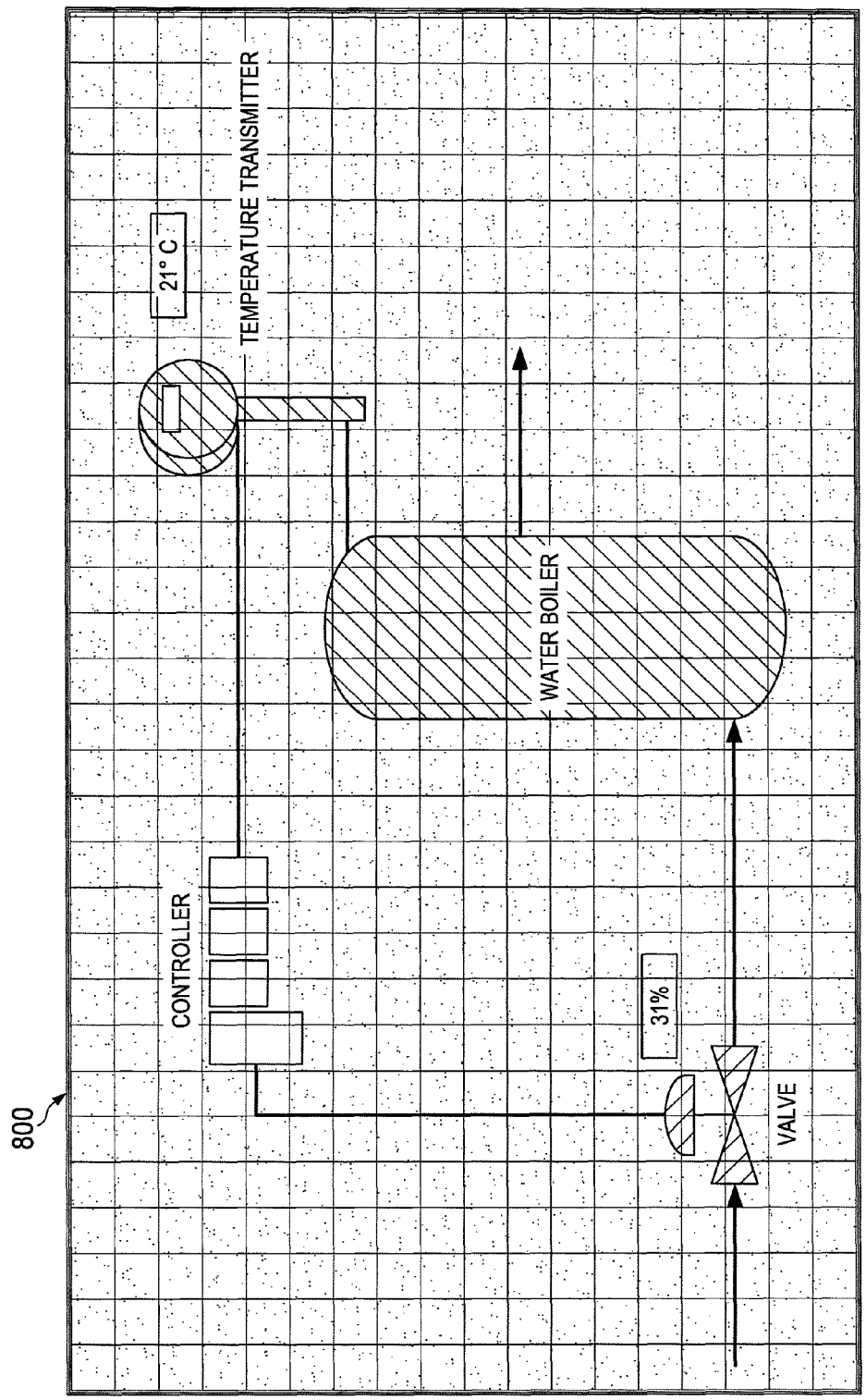
FIGS. 8A and 8B illustrate examples of a reconstructed image for the time interval during which the initial base screenshot of FIG. 3 was captured according to this disclosure.
Figure 8B:
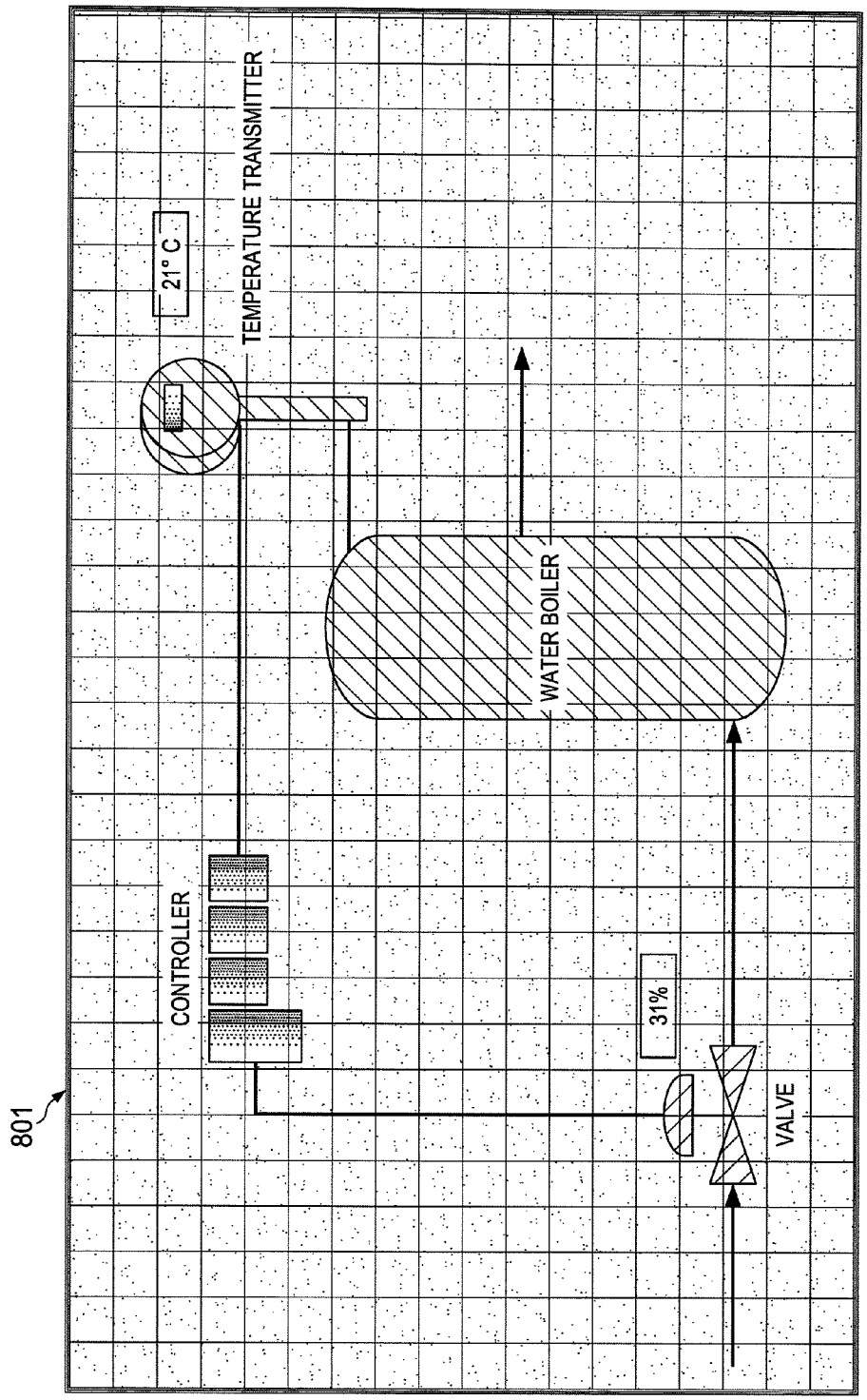

As a non-limiting example of reconstructing a new image for the time interval during which the initial base screenshot 300 of FIG. 3 was captured, the processing device 114 retrieves color data stored in Table 2 (operation 242), and applies the retrieved color data to the corresponding region of the base image (operation 244) according to the region location information stored in Table 2. The base image 700 in FIG. 7B shows that the grid 400 is used to locate where the normalized colors in Table 2 are applied to the textless base image 700. Further, the processing device 114 retrieves text data stored in Table 1 (operation 246), and overlaps the retrieved text data to the colored base image (operation 248). FIGS. 8A and 8B provide examples of a reconstructed image 800 and 801 for the time interval during which the initial base screenshot 300 was captured. The processing device 114 uses the grid 400 to locate where each text data from Table 1 of the initial base screenshot 300 overlaps the colored base image 700 according to the text location information stored in Table 1. When new images have been reconstructed for each of the time intervals (T) corresponding to the user selection to replay some of the archived periodic screenshots, the method 200 proceeds to Phase four 250.

In Phase four 250, the processing device 114 identifies the images and data that exhibit peculiarity. That is, the processing device 114 identifies the reconstructed base images and data that have a peculiar behavior. The processing device 114 can identify the peculiar images and/or the peculiar data by visually highlighting them. Examples of peculiar behavior includes: images that have sudden (for example, from one frame to a next frame, or within a limited number of consecutive frames) color changed devices; images that have sudden pressure and/or volume (PV) drop; images that have a sudden increase of pressure and/or volume; or images that have a sudden alarm(s). In certain embodiments, a user selection can set the limited number of consecutive frames within which a sudden change of color, PV, or alarm status occurs as an indicator of peculiar behavior. In certain embodiments, the processing device 114 can access a predetermined limited number of consecutive frames within which a sudden change of color, PV, or alarm status occurs as an indicator of peculiar behavior.

In Phase five 252, the processing device 114 represents the reconstructed images and stored data. More particularly, the processing device 114 implements a root cause analysis tool user interface (UI) (shown in FIGS. 9A and 9B) to provide display screens in the operator console 110 including the stored data and reconstructed images that were formed during the previous phases.

Although FIGS. 2A and 2B illustrate one example method 200 for performing post-mortem analysis of tripped field devices in the process industry using OCR and ICR techniques, various changes may be made to FIGS. 2A and 2B. For example, various steps in the figure could overlap, occur in parallel, or occur any number of times. That is, some of these operations can be performed more than once or in a different order, or some additional unspecified operations can also be performed for best performance and accuracy. As another example, in operation 210, the base image will be divided such that pixel's x-y coordinate values (shown in FIG. 10) of each region and of text can be used as an alternative or addition to a grid pattern (shown in FIG. 4). In the case of applying a coordinate system, the location of each pixel of the screenshot can be defined by an x-value and a y-value, each corresponding to a relative location from an origin of the coordinate system.

FIG. 3 illustrates an example base screenshot 300 of an operator console 110 display screen that provides a view of selected critical devices of a process unit according to this disclosure. The base screenshot 300 depicts a background, a critical process unit including selected critical devices, the labels of the critical devices, process flow connector arrows, process variable values within blocks associated with the critical devices, and a controller that controls the critical devices and the process flows using the process variable values. The controller can be a component within the process unit, or the controller can be a pre-programmed processing device, and for purposes of simplicity, FIG. 3 will be described as though the controller is a selected critical device of the process unit.

In the example shown, the background 305 has a background color, such as dark grey. The selected critical devices of the process unit include a valve 310, a boiler 315, a temperature transmitter 320, and a controller 325. The valve 310 may have, e.g., a green color; the boiler 315 may have a red color; and the temperature transmitter 320 may have a red color. The controller 325 is depicted as three similarly sized rectangular boxes and a longer rectangular box, each of which has gradient color that fades from white to black (in the left to right direction). The temperature transmitter 320 is depicted as a crescent, a circle on top of a vertically-elongated rectangle, the vertically-elongated rectangle, each or which has the color red. The temperature transmitter 320 further includes a rectangular portion 330 within the circle, and the rectangular portion 330 has a gradient color that fades from black to white (in the left to right direction), which is a different color than its red-colored surroundings. The text, namely, the labels of the critical devices and the process variable values, is black. Additionally, the process flow connector arrows have a same color as the text, namely, black. The process variable value blocks 335a-335b have a color, namely dark grey, which is the same as the background color. In certain embodiments, a process industry console station 110 uses images recommended by the International Society of Automation (ISA), but this is not mandatory, and non-ISA images can be used.

In the process unit, the valve 310 receives an inlet flow of water, and provides an outlet flow to the water boiler 315, such as by pumping the outlet flow to the boiler using a water pump. The process variable value "31%" that is depicted within the process variable value block 335a indicates a percent of openness of the valve. As such, the valve 310 receives or outputs 31% of its throughput capacity. The boiler 315 boils the fluid received from the valve 310, and provides an output flow. The process variable value "21° C." that is depicted within the process variable value block 335b indicates a current temperature of the fluid within the boiler 315. A temperature sensor can be associated with the boiler 315 so as to measure the temperature of the fluid in the boiler 315 and provide the temperature measurement to the temperature transmitter 320. The temperature transmitter 320 uses the temperature sensor to obtain the temperature measurement as process variable value "21° C.," provides the temperature measurement to the controller, and can transmit the process variable value to a receiver of another device. For example the controller 325 controls the position of the valve 310 based on the temperature measurement provided by the temperature transmitter 320.

Although FIG. 3 illustrates one example base screenshot 300, various changes may be made to FIG. 3. For example, a different process unit can be depicted, or the process unit can include more, less, or different field devices.

FIG. 4 illustrates the base screenshot 300 of FIG. 3 divided into a grid 400 according to this disclosure. In the example shown, the grid 400 includes eighteen (18) rows and thirty (30) columns. The grid 400 includes a set of blocks based on the image size, such that no blocks overlap. That is, each portion of the base screenshot 300 is covered by one block of the grid 400. In certain embodiments, each portion of the base screenshot 300 is covered by one whole block of the grid 400 such that no portion of the base screenshot is cover by a partial, less-than-whole block. Each block in the grid 400 can be equal in size to each other block in the grid 400.

The embodiment of the grid 400 shown in FIG. 4 is for illustration only. Other embodiments could be used without departing from the scope of the present disclosure. For example, other embodiments can include a different number of rows or columns in the grid.

FIG. 5 illustrates a textless base screenshot 500 according to this disclosure. That is, FIG. 5 shows the base screenshot of FIG. 3 with text data removed.

The text data of the initial base screenshot 300 which has been removed from the textless base screenshot 500 includes the critical device labels: "Controller," "Temperature transmitter," "Water Boiler," and "Valve." The text data of the initial base screenshot 300 which has been removed from the textless base screenshot 500 further includes the process variable values "21° C." and "31%."

Note that the OCR and ICR techniques can distinguish the border of the process variable value blocks 335a-335b from the text data each contains. As such, the textless base screenshot 500 includes the process variable value blocks 335a-335b.

FIG. 6 illustrates a region and sub-regions of the textless base screenshot 500 of FIG. 5 according to this disclosure. That is, the region IDs shown in FIG. 6 are for explanation purposes only, and are not part of the image of the textless base screenshot 500.

In the example shown, the textless base screenshot 500 includes Regions 0-11 and a sub-Region 9.1. Region 0 is the background 305. Region 1 is the longer rectangular box of the controller 325. Regions 2, 3, and 4 are the three similarly sized rectangular boxes of the controller 325. Region 5 is the boiler 315. Region 6 is a button-profile shaped portion of the valve 310, and Regions 7 and 8 are the triangular portions of the valve 310. Region 9 is the circle portion of the temperature transmitter 320, and Region 10 is the vertically-elongated rectangle portion of the temperature transmitter 320. Sub-region 9.1 is the rectangular portion 330 within the circle of the temperature transmitter 320. Region 11 is the process variable value block 335b, and Region 12 is the process variable value block 335a.

Although FIG. 6 illustrates one example identification of regions and sub-regions of the textless base screenshot, various changes may be made to FIG. 6. For example, the regions can be identified in a different order, or can be identified alphabetically, or alpha-numerically.

FIGS. 7A and 7B illustrate the base image 700 according to this disclosure. FIG. 7A shows that the base image 700 is the color-normalized result of applying color equalization to the textless base screenshot 500 of FIG. 5. FIG. 7B shows the base image 700 of FIG. 7A divided according to the grid 400 of FIG. 4.

As a non-limiting example, Regions 0, 11, and 12 can be assigned a dark grey color; Regions 1-4 and sub-region 9.1 can be assigned a light grey color; Regions 5 and 9-10 can be assigned a red color; and Regions 6-8 can be assigned a green color. This color convention is used just for illustration. In other instances, there may be any color to represent the health of each element.

Although FIGS. 7A and 7B illustrate one example base image 700, various changes may be made to FIGS. 7A and 7B. For example, Regions 1-4 and sub-region 9.1 could be normalized to a different shade or color.

FIGS. 8A and 8B illustrate examples of a reconstructed image 800 and 801 for the time interval during which the initial screenshot 300 of FIG. 3 was captured. The embodiments of the reconstructed image 800, 801 shown in FIGS. 8A and 8B are for illustration only. Other embodiments could be used without departing from the scope of the present disclosure.

In situations wherein the interval T elapses without any change to the text data shown on the display screen in the operator console 110, the reconstructed image 800 may appear as a color-normalized version of the previous base screenshot. As a specific example, the reconstructed image 800 of FIG. 8A can appear as a color-normalized version of the initial base screenshot 300 of FIG. 3. In other situations wherein a change to the text data or color data shown on the display screen in the operator console 110 occurs during the interval T, the reconstructed image may appear differently from a color-normalized version of the previous base screenshot.

FIG. 8B shows that the reconstructed image 801 can have the regions with a gradient of color when this information is stored as the part of operation 222. If any region has more than one gradient color and if there is an image reconstruction requirement for exact matches with screenshot 300 of console station 110, then each possible region image can be extracted, stored (such as in local storage), and a respective link to the stored region image will be provided in Table 2. Similarly, pixel's x-y coordinates of each region and each text can be stored, and the reconstructed image 801 will be constructed so as to accurately match with original console station screenshot.

Figure 9A:
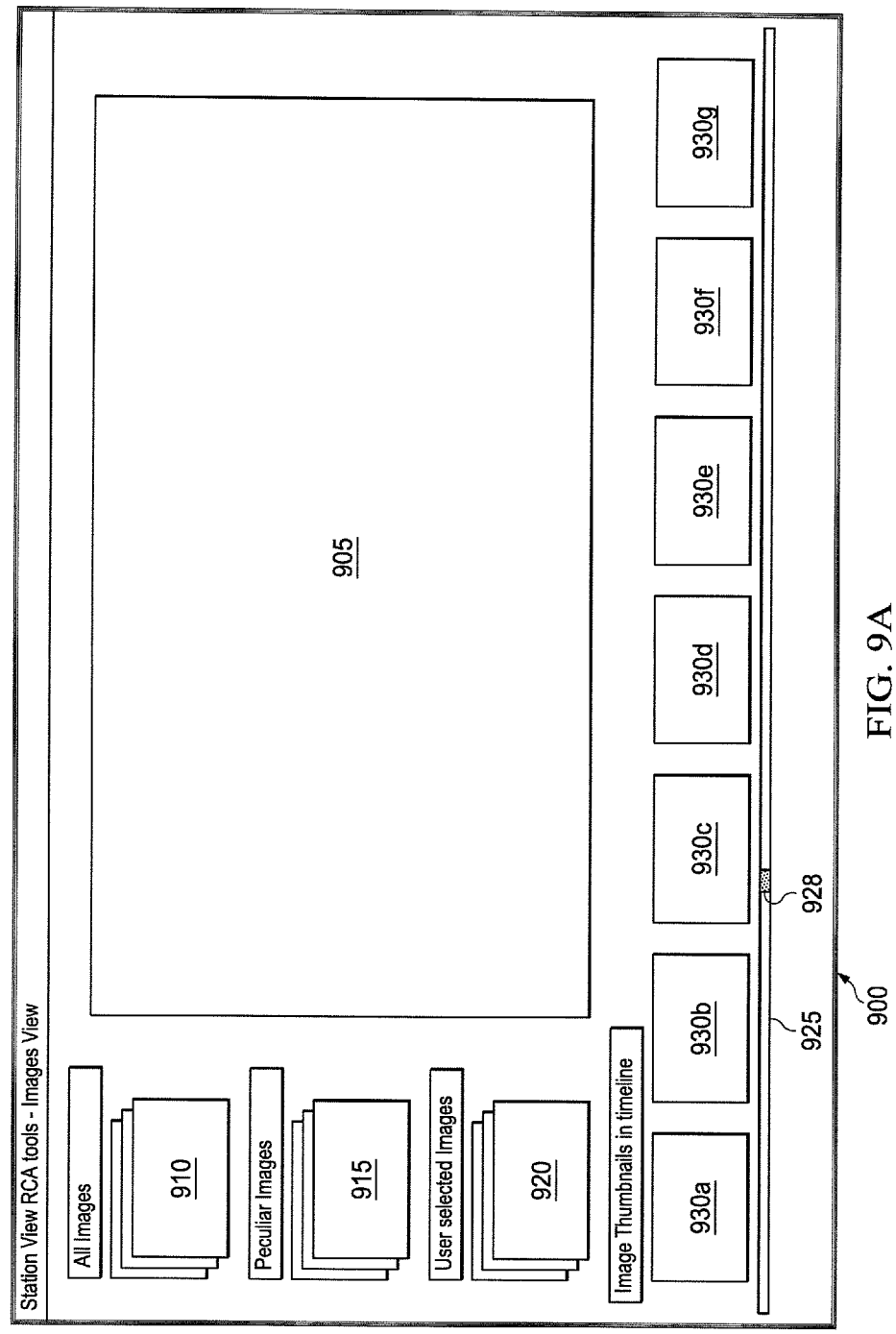
FIGS. 9A and 9B illustrate a root cause analysis tool user interface (UI) of display screens in the operator console according to this disclosure.
Figure 9B:
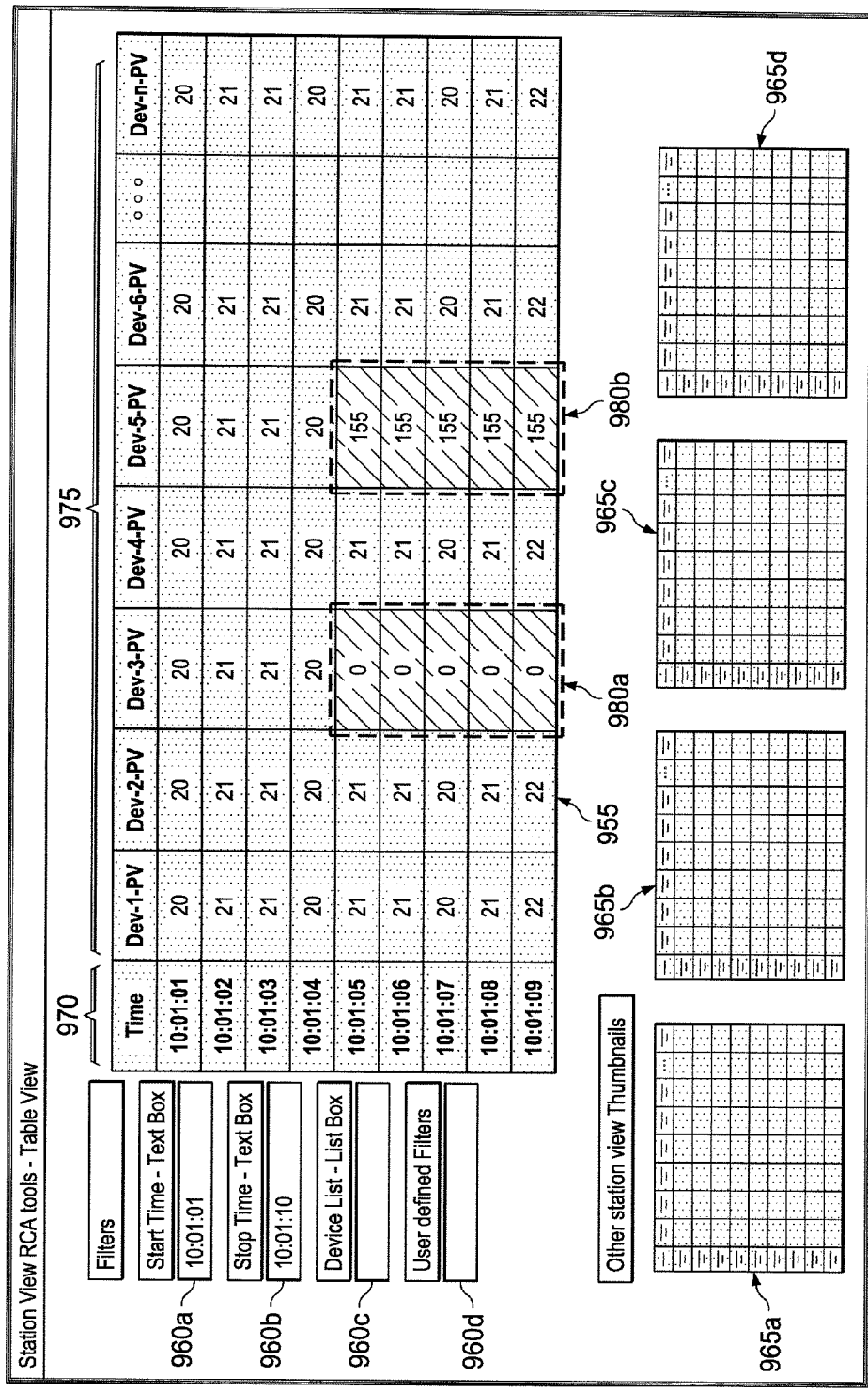

FIGS. 9A and 9B illustrate a root cause analysis tool user interface (UI) of display screens in the operator console 110 according to this disclosure. The FAMS application 120 includes the RCA tool UI. FIG. 9A illustrates an image view 900 of the RCA tool UI; and FIG. 9B illustrates a table view 901 of the RCA tool UI. The RCA tool UI shows the stored data and reconstructed images that were formed during the Phases one through four 202, 204, 240, 250. The processing device 114 can implement the image view 900 and table view 901 of the RCA tool UI by controlling or communicating with the display screens in the operator console 110.

As shown in FIG. 9A, the image view 900 of the RCA tool UI includes an image display box 905, a set of thumbnails 910, 915, 920 per category of images, a timeline 925 for a selected category of images, and image thumbnails 930a-930g from the selected category of images. The image display box 905 displays a currently selected image in a full size format. For example, the image display box 905 can show a reconstruction of the initial base screenshot. As another example, in response to receiving a user selection of one of the categories of images corresponding to a set of thumbnails 910, 915, 920, the image display box 905 can show an image from the selected set of thumbnails. As another example, in response to receiving a user selection of one of the image thumbnails 930a-930g, the image display box 905 can show a full size format of the selected image thumbnail.

In the example shown, there are categories of images: the "All Images" category corresponds to the set of thumbnails 910; the "Peculiar Images" category corresponds to the set of thumbnails 915; and the "User selected Images" category corresponds to the set of thumbnails 920. The All Images set of thumbnails 910 includes all of the images that were formed using the method 200 for performing post-mortem analysis of tripped field devices in the process industry using OCR and ICR techniques.

The Peculiar Images set of thumbnails 915 assist the user to pinpoint the root cause of a tripping occurrence of a field device within the process unit. The processing device 114 executes the operations of Phase four 250 to show the operator one or more images where operation limits of the field device were exceeded. The Peculiar Images set of thumbnails 915 includes the images that exhibit a peculiarity, as identified in the operations within phase four 250. That is, the set of thumbnails 915 includes a subset of the All Images set of thumbnails 910. The Peculiar Images set of thumbnails 915 can be a null set when none of the images exhibit peculiar behavior of the process unit.

The User selected Images set of thumbnails 920 includes the images selected by a user selection. For example, the user has a choice to select images of interest to form a new category, namely the category called "User selected Images." The user may drag and drop any image from the "All Images" category or the "Peculiar Images" category to the User selected Images set of thumbnails 920, in order to add the dragged/dropped image to the User selected Images category. The User selected Images set of thumbnails 920 can be a null set when none of the images have been selected by the operator.

The timeline 925 for a selected category of images represents a time period during which the selected category of images were captured. For example, when the "All Images" category is selected, the timeline 925 represents the time period from a Start Time (for example, shown by reference number 960*a* of FIG. 9B) to a Stop Time (for example, shown by reference number 960*b* of FIG. 9B). The Start Time can be when the initial base screenshot was captured. Examples of the Stop Time include, but are not limited to, when a most recent additional base screenshot was captured, a user-selected point in time, or a selected number of intervals T after the initial base screenshot was captured. The timeline 925 further includes a timeline bar 928, which visually represents a particular point in time or a particular subset of times between the Start Time and Stop Time. For example, the timeline bar 928 can represent the subset of time during which capturing of the images corresponding to the image thumbnails 930*a*-930*g* occurred.

In the example shown, the image thumbnails 930*a*-930*g* are labeled "Image Thumbnails in time line." That is, the image thumbnails 930*a*-930*g* from the selected category of images appear in an order according to the timeline.

Although FIG. 9A illustrates one example image view 900 of the RCA tool UI, various changes may be made to FIG. 9A. For example, each component in FIG. 9A could have any other size, shape, and dimensions.

As shown in FIG. 9B, the table view 901 of the RCA tool UI includes a table 955 of the data of the field devices in a particular time period, various filters 960*a*-960*d* for filtering field device data, and thumbnail images 965*a*-965*d* representing tables for other station views. The table 955 includes a column 970 of times at which the data was recorded. For example, the interval T can be one second, as such, each row can include field device data recorded per interval T. The table 955 further includes columns 975 for each field device in a particular process unit. The particular process unit can include any number of field devices (Dev-1-PV, Dev-2-PV, . . . Dev-n-PV), such as a pressure valves or other devices associated with pressure and/or volume. The cells within the table 955 can visually highlight peculiarities, such as by displaying a differently colored cell or differently emphasized font. The peculiarities can be a noteworthy change of value within the field device data. That is, the highlighted data 980*a*-980*b* assist the user to pinpoint the root cause of a tripping occurrence of a field device within the process unit. The processing device 114 executes the operations of Phase four 250 to show the operator one or more images where operation limits of the field device were exceeded.

As a specific non-limiting example, the field device DEV-3-PV exhibits peculiar behavior by its sudden reduction of value, namely from a value of 20 at the time 10:01:04 to a value of zero at the time 10:01:05. A 20 unit change or reduction of value can be a noteworthy change (e.g., change by a threshold amount), depending on settings of the RCA tool user interface (UI). As another example, the field device DEV-5-PV exhibits peculiar behavior by its sudden increase of value, namely from a value of 20 at the time 10:01:04 to a value of 155 at the time 10:01:05. A 135 unit change or increase of value can be a noteworthy change, depending on settings of the RCA tool user interface (UI). In these examples, the zero and 155 values for the field device data can be outside a normal operating range or other operating limit of the devices, and as such have cells highlighted in a different color (e.g., red) than the color (e.g., lavender) of the cells that contain non-peculiar values. That is, from the time 10:01:05 to the time 10:01:09, the field devices DEV-3-PV and DEV-5-PV have highlighted field device data.

In the example shown, the table view 901 of the RCA tool UI includes four filters, however, any suitable number of filters can be applied to the table 955. Examples of filters be adjusted based on user selections, such as using a text box for a Start Time filter 960*a*, a text box for a Stop-Time filter 960*b*, a list box for a Device List filter 960*c*, or other suitable selection-method for a User-defined filter 960*d*. The range of the column 970 of times set determined by the time 10:01:01 as the setting of the Start Time filter 960*a* and the time 10:01:10 as the setting of the Stop Time filter 960*b*.

In the example shown, the thumbnail images 965*a*-965*d* represent tables for four other station views, however, any suitable number of thumbnail images can be displayed in the table view 901 of the RCA tool UI. As described above, the FAMS application 120 provides a tool to select the available views of various process units running on various operator consoles 110, and as such, the thumbnail image 965*a* could correspond to a first process unit running on one operator console 110, and each of the other thumbnail images 965*b*-965*d* could correspond to second through fourth process units, each running on different operator consoles 110.

Although FIG. 9B illustrates one example table view 901 of the RCA tool UI, various changes may be made to FIG. 9B. For example, each component in FIG. 9B could have any other size, shape, and dimensions.

Figure 10:
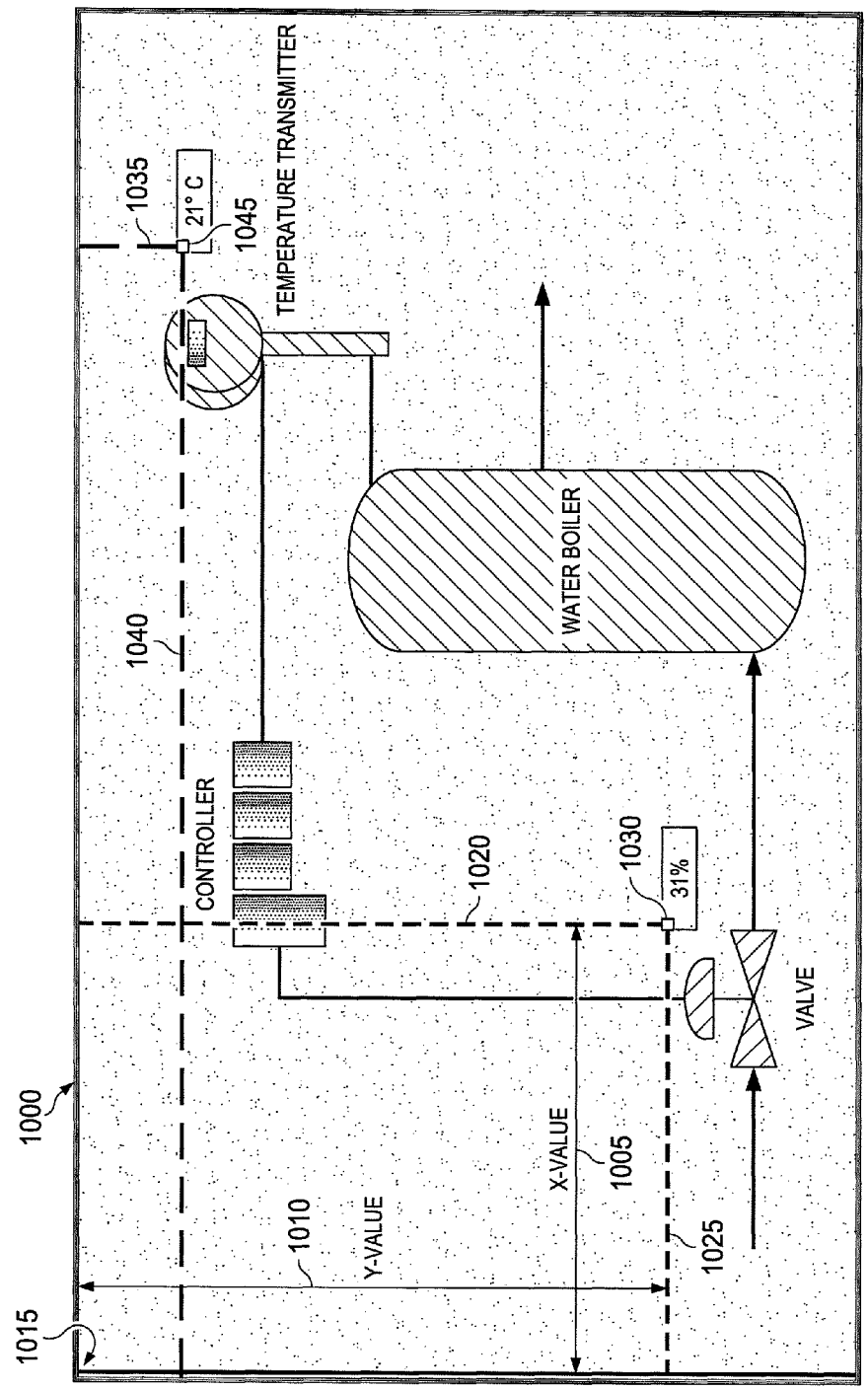
FIG. 10 illustrates a coordinate system applied to the base screenshot of FIG. 3 according to this disclosure.

FIG. 10 illustrates a coordinate system 1000 applied to the base screenshot 300 of FIG. 3 according to this disclosure. For more accuracy and performance, the processing device 114 can apply the coordinate system 1000 to any initial or subsequent screenshot for use in parameterizing the location of each text data and of each region in the base screenshot. In the coordinate system 1000, the location of each pixel of the screenshot can be defined by an x-value 1005 and a y-value 1010, each corresponding to a relative location from an origin 1015 of the coordinate system. As an example, the origin 1015 can be the top left corner of the base screenshot 300, such that the pixel at the origin 1015 has a y-value of zero and an x-value of zero.

As an example, the processing device 114 can determine that the text data within the process variable value block 335*b*, namely, Region 12, has a left boundary 1020 and a top boundary 1025 that form a vertex at the pixel 1030. The processing device 114 can determine that the vertex pixel 1030 or left boundary 1020 is disposed horizontally or rightward from the origin 1015 by an x-value 1005 number of pixels. The processing device 114 can determine that the vertex pixel 1030 or the top boundary 1025 is disposed vertically or downward from the origin 1015 by a y-value 1010 number of pixels. The processing device 114 can apply a similar process to determine the location of other boundaries of a region or other text data. For example, the processing device 114 can determine that the text data within the process variable value block 335*b*, namely, Region 11, has a left boundary 1035 and a top boundary 1040 that form a vertex at the pixel 1045.

As shown in FIG. 10, pixels's x and y coordinates can be used for more accuracy and performance. In some embodiments, the pixels' x-y coordinate values of the rectangle that covers the element (namely, text, region, etc.) in the base screenshot 300 also can be used for better accuracy than the grid 400 of FIG. 4.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
    capturing at least one screenshot of a display screen including an initial screenshot;
    removing text from the initial screenshot to generate a base image;
    identifying a background of the initial screenshot as a closed region; and
    for each of the at least one screenshot:
        storing a time of capturing the screenshot;
        identifying text, text color, and text location in the screenshot;
        identifying each closed region in the screenshot that is different from the background of the initial screenshot, and a region color and region location for each identified closed region in the screenshot;
        storing the region color and the region location for each identified closed region; and
        storing the text color and the text location of the identified text.

2. The method of claim 1, further comprising generating at least one new image as a reconstruction of the at least one captured screenshot by, for each new image:
    retrieving the base image; and
    in correspondence to one of the at least one captured screenshots and its stored time of capturing:
        retrieving the region color and the region location for each identified region, and the text color and the text location of the identified text;
        applying the retrieved region color to each region of the base image at the retrieved region location; and
        overlapping the retrieved base image with the text in the retrieved text color at the retrieved text location.

3. The method of claim 1, further comprising:
    identifying a new image exhibiting a peculiarity, wherein the peculiarity includes at least one of: a change of field device data by at least a threshold amount, or a field device data operating outside an operating limit; and
    generating a user interface display screen highlighting the peculiarity.

4. The method of claim 1, wherein capturing the at least one screenshot of the display screen comprises:
    periodically capturing an additional screenshot according to a specified interval of time.

5. The method of claim 1, wherein:
    identifying the region color for each identified closed region in the screenshot further comprises: normalizing each unevenly colored region to a uniform color; and
    storing the region color for each identified closed region further comprises: storing the normalized region color corresponding to the identified region.

6. The method of claim 1, further comprising:
    identifying each closed region within an identified region as a sub-region; and
    assigning a region identification to each identified region and sub-region using a tree structure.

7. The method of claim 1, further comprising:
    dividing the screenshot into a grid;
    determining the text location according to the grid; and
    determining the region location according to the grid.

8. The method of claim 7, wherein dividing the screenshot into the grid comprises one of:
    applying a coordinate system to the screenshot; or
    dividing the screenshot into a set of blocks arranged in rows and columns.

9. An apparatus comprising:
    a memory; and
    at least one processor coupled to the memory, the at least one processor configured to:
        capture at least one screenshot of a display screen including an initial screenshot;
        remove text from the initial screenshot to generate a base image;
        identify a background of the initial screenshot as a closed region; and
        for each of the at least one screenshot:
            store a time of capturing the screenshot in the memory;
            identify text, text color, and text location in the screenshot;
            identify each closed region in the screenshot that is different from the background of the initial screenshot, and a region color and region location for each identified closed region in the screenshot;
            store, in the memory, the region color and the region location for each identified closed region; and
            store, in the memory, the text color and the text location of the identified text.

10. The apparatus of claim 9, wherein the at least one processor is further configured to generate at least one new image as a reconstruction of the at least one captured screenshot by, for each new image:

retrieving the base image; and in correspondence to one of the at least one captured screenshots and its stored time of capturing:

retrieving the region color and the region location for each identified region, and the text color and the text location of the identified text;

applying the retrieved region color to each region of the base image at the retrieved region location; and overlapping the retrieved base image with the text in the retrieved text color at the retrieved text location.

11. The apparatus of claim 9, wherein the at least one processor is further configured to:

identify a new image exhibiting a peculiarity, wherein the peculiarity includes at least one of: a change of field device data by at least a threshold amount, or a field device data operating outside an operating limit; and generate a user interface display screen highlighting the peculiarity.

12. The apparatus of claim 9, wherein the at least one processor is further configured to capture the at least one screenshot of the display screen by:

periodically capturing an additional screenshot according to a specified interval of time.

13. The apparatus of claim 9, wherein the at least one processor is further configured to:

identify the region color for each identified closed region in the screenshot by normalizing each unevenly colored region to a uniform color; and store the region color for each identified closed region by storing the normalized region color corresponding to the identified region.

14. The apparatus of claim 9, wherein the at least one processor is further configured to:

identify each closed region within an identified region as a sub-region; and assign a region identification to each identified region and sub-region using a tree structure.

15. A non-transitory computer readable medium embodying a computer program, the computer program comprising computer readable program code that, when executed by processing circuitry, causes the processing circuitry to:

capture at least one screenshot of a display screen including an initial screenshot;

remove text from the initial screenshot to generate a base image;

identify a background of the initial screenshot as a closed region; and for each of the at least one screenshot:

store a time of capturing the screenshot in memory;

identify text, text color, and text location in the screenshot;

identify each closed region in the screenshot that is different from the background of the initial screenshot, and a region color and region location for each identified closed region in the screenshot;

store the region color and the region location for each identified closed region; and store the text color and the text location of the identified text.

16. The non-transitory computer readable medium of claim 15, wherein the computer program further comprises computer readable program code that, when executed by the processing circuitry, causes the processing circuitry to: generate at least one new image as a reconstruction of the at least one captured screenshot by, for each new image:

retrieving the base image; and in correspondence to one of the at least one captured screenshots and its stored time of capturing:

retrieving the region color and the region location for each identified region, and the text color and the text location of the identified text;

applying the retrieved region color to each region of the base image at the retrieved region location; and overlapping the retrieved base image with the text in the retrieved text color at the retrieved text location.

17. The non-transitory computer readable medium of claim 15, wherein the computer program further comprises computer readable program code that, when executed by the processing circuitry, causes the processing circuitry to:

identify a new image exhibiting a peculiarity, wherein the peculiarity includes at least one of: a change of field device data by at least a threshold amount, or a field device data operating outside an operating limit; and generate a user interface display screen highlighting the peculiarity.

18. The non-transitory computer readable medium of claim 15, wherein the computer program further comprises computer readable program code that, when executed by the processing circuitry, causes the processing circuitry to:

capture the at least one screenshot of the display screen by periodically capturing an additional screenshot according to a specified interval of time.

19. The non-transitory computer readable medium of claim 15, wherein the computer program further comprises computer readable program code that, when executed by the processing circuitry, causes the processing circuitry to:

identify the region color for each identified closed region in the screenshot by normalizing each unevenly colored region to a uniform color; and store the region color for each identified closed region by storing the normalized region color corresponding to the identified region.

20. The non-transitory computer readable medium of claim 15, wherein the computer program further comprises computer readable program code that, when executed by the processing circuitry, causes the processing circuitry to:

identify each closed region within an identified region as a sub-region; and assign a region identification to each identified region and sub-region using a tree structure.

\* \* \* \* \*